(12) United States Patent
Adams et al.

(10) Patent No.: US 7,628,378 B2
(45) Date of Patent: Dec. 8, 2009

(54) PROPORTIONAL SOLENOID WITH ARMATURE MOTION SENSING

(75) Inventors: Rory K. Adams, Kalamazoo, MI (US); Jeffrey L. Huffman, Paw Paw, MI (US)

(73) Assignee: FEMA Corporation of Michigan, Portage, MI (US)

( * ) Notice: Subject to any disclaimer, the term of this patent is extended or adjusted under 35 U.S.C. 154(b) by 409 days.

(21) Appl. No.: 11/805,044

(22) Filed: May 22, 2007

(65) Prior Publication Data
US 2008/0290974 A1    Nov. 27, 2008

(51) Int. Cl.
*F16K 31/02* (2006.01)
(52) U.S. Cl. .................. 251/129.04; 335/229; 335/301; 324/207.2; 340/644
(58) Field of Classification Search ......... 335/177–184, 335/229–234, 301; 310/15–35; 251/129.01–129.22; 324/207.11–207.26; 340/644; 239/585.1–585.5
See application file for complete search history.

(56) References Cited

U.S. PATENT DOCUMENTS

| | | | |
|---|---|---|---|
| 6,281,772 B1 | 8/2001 | Adams | |
| 6,321,781 B1 | 11/2001 | Kurth | |
| 6,404,186 B1 | 6/2002 | Schoedlbauer | |
| 6,455,185 B2 | 9/2002 | Bircann et al. | |
| 6,588,262 B2 | 7/2003 | Kirzhner et al. | |
| 6,666,429 B2 | 12/2003 | Fukano et al. | |
| 6,948,697 B2 * | 9/2005 | Herbert et al. | 251/129.04 |

* cited by examiner

*Primary Examiner*—Ramon M Barrera
(74) *Attorney, Agent, or Firm*—Flynn, Thiel, Boutell & Tanis, P.C.

(57) ABSTRACT

A shielded solenoid for a solenoid operated valve having a solenoid body and an annular coil of electrical wire in the solenoid body. An armature of magnetic material is rectilinearly movable with respect to the body. A magnet holder is fastened to the armature and has a permanent magnet fixedly oriented thereon. A shield member covers the magnet holder and the permanent magnet. The shield member is configured to shield a Hall effect sensor from any significant electromagnetic field produced by the coil when effecting rectilinear movement of the armature. The hollow shield member has a non-metallic plug closing one end thereof. The plug has the Hall effect sensor oriented therein to closely oppose the magnet on the magnet holder so that movement of the armature and resulting corresponding movement of the magnet will cause the Hall effect sensor to produce a signal indicative of movement of the armature.

18 Claims, 1 Drawing Sheet

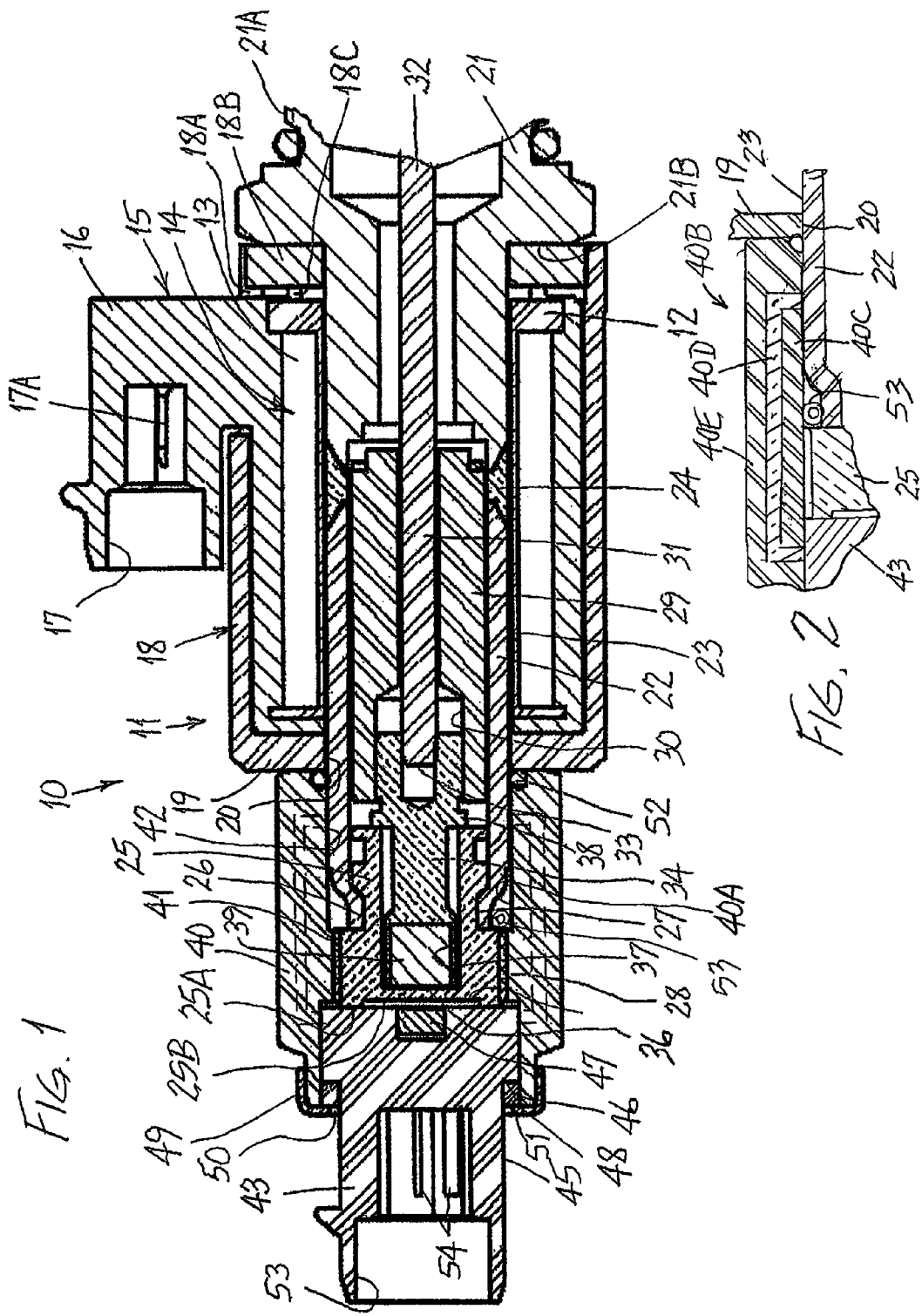

PROPORTIONAL SOLENOID WITH ARMATURE MOTION SENSING

FIELD OF THE INVENTION

The present invention relates to a flow rate control valve, and more particularly, to a proportional solenoid operated valve having a shielded armature motion sensing feature.

BACKGROUND OF THE INVENTION

Solenoid valves have been conventionally used to control the flow rate of a fluid by using a solenoid to control valve activation. A conventional solenoid valve has a magnetic sensor, which is typically a Hall effect sensor, that effectively senses movement of a component and thus provides positional information for a moving component positioned in high pressure fluid in a fluid delivery device.

The Hall effect sensor used in motion sensing can offer enhanced reliability in extreme environments. A coil contained in the solenoid valve produces an electromagnetic field that may interfere with the accurate performances of the Hall effect sensor, but the prior art, such as Fukano et al., U.S. Pat. No. 6,666,429, does not have any protective mechanism to prevent external electromagnetic fields from interfering with the Hall effect sensor.

It is an object of the invention to provide a shield made of an appropriate protective material so that the performance characteristics of the Hall effect sensor are not compromised by external electromagnetic fields created by the solenoid coil.

SUMMARY OF THE INVENTION

The invention is directed to a shielded solenoid for a solenoid operated valve having a solenoid body and an annular coil of electrical wire in the solenoid body which has a central hole therethrough. A first hollow magnetic pole piece is oriented in the central hole adjacent a first axial end face of the annular coil. A second hollow magnetic pole piece is coaxially oriented with respect to the first pole piece in the central hole adjacent a second axial end face of the annular coil remote from the first axial end face and being magnetically isolated from and immovably fixed with respect to the first pole piece. An end of the second hollow pole piece has a non-magnetic plug member closing an open end thereat. An armature of magnetic material is rectilinearly movably displaceably mounted in the first and second hollow magnetic pole pieces. A non-magnetic rod part projects coaxially from at least one axially facing end thereof and is rectilinearly movable with the armature. The non-magnetic rod part has a magnet holder fastened thereto and has a permanent magnet fixedly oriented thereon. A hollow metallic shield member covers a segment of an outer periphery of the second pole piece whereat the magnet holder and the permanent magnet are oriented. The shield member is configured to shield a Hall effect sensor from any significant electromagnetic field produced by the coil when effecting rectilinear movement of the armature. The hollow shield member has a non-metallic plug closing one end thereof. The plug has the Hall effect sensor oriented therein to closely oppose the magnet on the magnet holder so that movement of the armature and resulting corresponding movement of the magnet will cause the Hall effect sensor to produce a signal indicative of movement of the armature.

BRIEF DESCRIPTION OF THE DRAWINGS

Other objects and purposes of this invention will be apparent to persons acquainted with apparatus of this general type upon reading the following specification and inspecting the accompanying drawing, in which:

FIG. 1 illustrates a central, longitudinal cross sectional view of the proportional solenoid valve with a motion sensor in accordance with an embodiment of the invention; and FIG. 2 is a fragmentary view of a modified shield member.

DETAILED DESCRIPTION

The solenoid portion 10 of a solenoid operated valve is illustrated in the drawing. The solenoid portion 10 includes a solenoid body 11 having a hollow cylindrical, non-metallic bobbin 12 on which is wound many turns of wire 13 to form an annular coil 14.

The annular coil 14 is encased in a non-metallic synthetic resin shell 15 which has a radially outwardly extending flange 16 having a plug socket 17 formed therein so that electrical contact prongs 17A are exposed in the socket for electrical connection to a plug not shown. The contact prongs 17A are electrically connected to the wire 13 forming the annular coil 14 so as to facilitate the provision of electrical energy to the coil 14.

In this particular embodiment, the shell 15 is oriented inside a steel cup 18 having a through-hole 20 in the bottom wall 19 thereof and with the flange 16 projecting through a slot 18A in the rim of the open end of the cup 18. The shell 15 is retained inside the steel cup 18 by press fitting a washer 18B into the open end of the steel cup. In this particular embodiment, a compressible spring o-ring type seal 18C is oriented between the washer 18B and the shell 15.

A first elongate hollow tubular magnetic pole piece 21 has an externally thread end section 21A configured to screw into an internally threaded hole in a valve body not shown. The other end of the pole piece 21 is fixedly oriented inside the interior of the hollow bobbin 12.

In this particular embodiment, the first pole piece 21 extends into the interior of the bobbin 12 a finite distance. A second elongate hollow tubular magnetic pole piece 22 is coaxially oriented with respect to and secured by an also coaxially oriented non-magnetic member 24, and oriented about the mid-portion of the hollow interior of the bobbin 12, to an end of the first pole piece 21 that is remote from the valve body. The second pole piece 22 extends a finite distance beyond the end of the bobbin 12 that is remote from the valve body and through and beyond the hole 20 in the bottom wall 19 of the steel cup 18. It is beneficial for the clearance dimension between the inner diameter surface of the hole 20 and an outer diameter surface 23 of the pole piece 22 to be as small as is reasonable for assembly in order to optimize the magnetic shielding.

A non-magnetic, here brass, hollow plug 25 is secured to the open end of the second pole piece 22 by any convenient structure. Here, the plug 25 has a reduced diameter portion 26 receives therein the crimped open end 27 of the second pole piece 22. In addition, the portion of the plug 25 extending axially beyond the pole piece 22 has an external thread 28 thereon, the purpose of which will be explained in more detail below. The axially facing end wall 25A of the hollow plug 25 has a shallow centrally oriented recess 25B therein, the purpose of which will be explained in more detail below.

A hollow armature 29 made of magnetic material is rectilinearly movably and displaceably mounted internally of the pole pieces 21 and 22. A non-magnetic rod 31 extends through the interior of the armature 29 and is secured as by being pressed fit therein. Other forms of securement of the rod 31 to the armature 29 are to be considered as being within the scope of this invention.

In this particular embodiment, the rod 31 extends axially beyond both ends of the armature 29. The end 32 of the rod 31 extends through the interior of the pole piece 21 and is operatively connected to a movable valve member (not illustrated) inside the valve body for controlling the flow of fluid through the valve body in a well understood way. The opposite end 33 of the rod 31 has a magnet holder 34 fixedly secured thereto and movable therewith.

In this particular embodiment, the magnet holder 34 has an opening in one end 35 into which the distal end 33 of the rod 31 is pressed fit. The opposite end 36 of the magnet holder 34 has an axially opening cup shaped opening 37 therein into which is fixedly oriented a permanent magnet 39. In this particular embodiment, the outer diameter of the magnet holder 34 is conformed to the hollow interior of the plug 25 so as to be relatively movably and slidably received therein.

The hollow interior 30 of the armature 29 at an end from which the end 33 of the rod 31 extends is enlarged and is configured to attach to the magnet holder 34. The attachment of the magnet holder 34 to the armature 29 can be formed by being pressed fit or by using a threaded connection. The magnet holder 34 also has a radially outwardly extending flange 38 thereon that is configured to abut against the end of the plug 25 oriented inside the pole piece 22.

A hollow steel cylindrical shield member 40 having an internal thread 41 thereon oriented mid-length of the shield member 40 is threadedly secured to the external thread 28 on the plug 25. The interior surface 40A of the shield member 40 on one side of the internal thread 41 has a diameter closely conforming to the external diameter surface 23 of the second pole piece 22 so as to facilitate the interior part 42 of the shield member 40 snuggly sliding over the exterior surface 23 of the second pole piece 22. A reduction of the clearance dimension between the outer diameter surface 23 and the inner diameter surface 40A to as small as is reasonable for assembly is important for the purpose of optimizing the magnet shielding.

A synthetic resin plug 43 having a Hall effect sensor 47 encased therein is slidably received into an open end of the shield member 40 on a side of the internal thread 41 remote from the interior part 42.

In this particular embodiment, the Hall effect sensor 47 is oriented at one end of the plug 43 close to an axially facing flat surface 44 of the plug 43 that opposes the shallow recess 25B in the end wall 25A of the plug 25. The circumferential periphery of the plug 43 adjacent an end remote from the Hall effect sensor 47 has a reduced diameter section 45 forming a shoulder 46 onto which is provided a compressible spring 48.

A cup shaped cap 49 having a central through-hole 50 in the bottom wall 51 through which extends the reduced diameter section 45 of the plug 43 is secured to the end of the steel shield member 40. The segment of the bottom wall 51 surrounding the through-hole 50 serves as an abutment for the end of the compressible spring 48 that is oriented remote from the end abutting the shoulder 46.

The compressible spring 48 initially urges the plug 43 into engagement with the shoulder 46. However, as the internal thread 41 of the shield member 40 is threaded onto the external thread 28 of the plug 25, the flat surface 44 of the plug 43 will abut the end face of the wall 25A of the plug 25 in the area radially outside the shallow recess 25B so that any forces developed during the engagement will not cause harmful mechanical stress to be applied to the Hall effect sensor 47 during assembly. A continued rotation of the shield member 40 to effect the aforesaid threaded engagement of the threads 28 and 41 will cause a relative axial movement of the shield member 40 toward the bottom wall of the steel cup 18 and a compression of the spring 48 until the shield member 40 abuts the surface of the bottom wall of the steel cup 18. A continued rotation of the shield member 40 will cause an urging of the steel cup 18 toward the valve body (not illustrated) until the washer 15B tightly abuts against a shoulder 21B on the pole piece 21. Thus, the single step of screwing the shield member 40 onto the threads 28 causes a proper orienting of the Hall effect sensor 47 with respect to the magnet 39 and a locking of the annular coil 14 in the proper position on the valve body and with respect to the pole pieces 21 and 22.

A rubber o-ring 52 can, if desired, be provided between the shield member 40 and the bottom wall of the steel cup 18. On the other hand, the rubber o-ring 52 can be replaced with a metal seal ring 52A configured to wedge into contact with the shield member 40, the bottom wall 19 of the steel cup 18 and the surface 23 of the pole piece 22 in order to optimize the magnetic shielding. In addition, a hollow or split steel ring 53 can be provided in the region of the crimped portion 27 of the pole piece 22 and configured to contact the pole piece 22 and the shield member 40 in order to enhance the magnetic shielding. The ring 53 does not need to completely encircle the aforesaid structure.

The Hall effect sensor 47 has a plurality of wires connected in a conventional way to it, and they extend through the synthetic resin plug 43 in a conventional way and exit the plug 43 in the form of a socket 53 having plural prongs 54 therein to which each respective wire is attached to facilitate the reception of a plug member (not illustrated) that can be received to connect the prongs to electrically conductive sockets provided on the plug.

The magnetic shielding for the aforesaid structure can be further enhanced by modifying the shield member 40 to include three components as shown in FIG. 2. More specifically, the modified shield member 40B includes a steel shield member 40C comparable to the steel shield member 40 described above and which has the internal thread 41 thereon. Surrounding the steel shield member 40C is a non-magnetic material 40D which in turn is surrounded by a further steel shield member 40E. The non-magnetic material 40D serves to isolate the steel shield member 40C from the steel shield member 40E. The modified shield member 40B combined with the hollow or split steel ring 53 and the steel seal ring 52A and the close tolerance fit of the steel shield member 40B to the surface 23 on the pole piece 22 and the close tolerance fit of the surface 23 on the pole piece 22 in the hole 20 provides a very effective magnetic shield isolating the effects of the magnetic field from the operating coil on the Hall effect sensor 47.

The shield member 40 is configured to shield the Hall effect sensor 47 from any significant electromagnetic field produced by said coil 14 during periods of activation causing rectilinear movement of the armature 29.

Although a particular preferred embodiment of the invention has been disclosed in detail for illustrative purposes, it will be recognized that variations or modifications of the disclosed apparatus, including the rearrangement of parts, lie with the scope of the present invention.

What is claimed is:

1. A shielded solenoid for a solenoid operated valve, comprising:
   a solenoid body;
   an annular coil of electrical wire in said solenoid body, having a central hole therethrough;
   a first hollow magnetic pole piece oriented in said central hole adjacent a first axial end face of said annular coil and a second hollow magnetic pole piece coaxially oriented with respect to said first pole piece in said central hole adjacent a second axial end face of said annular coil remote from said first axial end face and being magnetically isolated from and immovably fixed with respect to said first pole piece, an end of said second hollow pole piece having a non-magnetic plug member closing an open end threat;
   an armature of magnetic material rectilinearly movably displaceably mounted in said first and second hollow magnetic pole pieces, having a non-magnetic rod part projecting coaxially from at least one axially facing end thereof and being rectilinearly movable with said armature, said non-magnetic rod part having a magnet holder fastened thereto, said magnet holder having a permanent magnet fixedly oriented thereon;
   a hollow metallic shield member having a non-metallic plug closing one end thereof, said plug having a Hall effect sensor oriented therein to closely oppose said magnet on said magnet holder, said hollow metallic shield member covering a segment of an outer periphery of said second pole piece whereat said Hall effect sensor, said magnet holder and said permanent magnet are oriented, said shield member being configured to shield a Hall effect sensor from any significant electromagnetic field produced by said coil when effecting rectilinear movement of said armature so that movement of said armature and resulting corresponding movement of said magnet will cause said Hall effect sensor to produce a signal indicative of movement of said armature.

2. The shielded solenoid according to claim 1, wherein said solenoid body includes a non-metallic synthetic resin shell in which said annular coil is encased.

3. The shielded solenoid according to claim 1, wherein said annular coil includes a hollow bobbin, said first hollow tubular magnetic pole piece being fixedly oriented inside said hollow bobbin.

4. The shielded solenoid according to claim 1, wherein said first and second pole pieces are coaxially oriented and separated by a non-magnetic member which is coaxially oriented with respect to and secured to each thereof.

5. The shielded solenoid according to claim 1, wherein said second pole piece has an axially opening end, said non-magnetic plug member being received in said open end.

6. The shielded solenoid according to claim 5, wherein said magnet holder has an axially opening cup-shaped opening therein into which is fixedly oriented said permanent magnet.

7. The shielded solenoid according to claim 6, wherein said non-magnetic plug member has a hollow interior which opens axially, the outer diameter of said magnet holder being conformed to the hollow interior of said non-magnetic plug member.

8. The shielded solenoid according to claim 1, wherein the hollow interior of said armature at an end from which the end of said non-magnetic rod part extends is enlarged and is configured to attach to said magnet holder.

9. The shielded solenoid according to claim 1, wherein the attachment of said magnet holder to said armature can be formed by one of a pressed fit and a threaded connection.

10. The shielded solenoid according to claim 1, wherein said magnet holder has a radially outwardly extending flange thereon that is configured to abut against the end of said non-magnetic plug member oriented inside said second hollow magnetic pole piece.

11. The shielded solenoid according to claim 1, wherein said hollow magnetic shield member includes a steel cup having a through-hole in the bottom wall thereof configured to prevent electromagnetic field produced by said coil from affecting said Hall effect sensor, said steel cup encircling said annular coil.

12. The shielded solenoid according to claim 11, wherein said non-magnetic plug member has an external thread, said hollow metallic shield member additionally includes a hollow steel sleeve having an internal thread thereon threadedly secured to the external thread on said non-magnetic plug member.

13. The shielded solenoid according to claim 12, wherein said threaded engagement of said hollow metallic shield member onto said external thread on said non-magnetic plug member operative simultaneously results in the proper orientation of said Hall effect sensor with said magnet and a locking of said annular coil in the proper orientation with respect to said first and second hollow pole pieces.

14. The shielded solenoid according to claim 12, wherein the interior of said hollow steel sleeve on one side of said internal thread has a diameter closely conforming to an external diameter of said second hollow magnetic pole piece.

15. The shielded solenoid according to claim 12, wherein said non-metallic plug is slidably received into an open end of said hollow steel sleeve.

16. The shielded solenoid according to claim 14, wherein said open end of said steel sleeve remote from said second magnetic pole piece has a cap thereon, the circumferential periphery of said non-metallic plug has a reduced diameter section forming a shoulder, and a compressible spring being oriented between and abutting against said shoulder and said cap.

17. The shielded solenoid according to claim 12, wherein an o-ring is provided between said hollow steel sleeve and the bottom wall of said steel cup.

18. The shielded solenoid according to claim 1, wherein said Hall effect sensor has a plurality of wires that extend through said non-metallic plug and exit said non-metallic plug in the form of a socket having plural prongs therein to which each respective wire is attached to facilitate the reception of a plug member that can be received to connect said prongs to said electrically conductive sockets provided on said non-metallic plug.

* * * * *